United States Patent
Haga

(10) Patent No.: US 12,172,768 B2
(45) Date of Patent: Dec. 24, 2024

(54) FLYING OBJECT CONTROL DEVICE, FLYING OBJECT CONTROL METHOD, AND NON-TRANSITORY COMPUTER-READABLE STORAGE MEDIUM STORING PROGRAM

(71) Applicant: HONDA MOTOR CO., LTD., Tokyo (JP)

(72) Inventor: Hisao Haga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 117 days.

(21) Appl. No.: 18/176,527

(22) Filed: Mar. 1, 2023

(65) Prior Publication Data
US 2023/0278720 A1 Sep. 7, 2023

(30) Foreign Application Priority Data
Mar. 4, 2022 (JP) ................................. 2022-033417

(51) Int. Cl.
| | |
|---|---|
| B64D 31/06 | (2024.01) |
| B60L 3/00 | (2019.01) |
| B60L 50/60 | (2019.01) |
| B64D 27/02 | (2006.01) |
| B64D 27/10 | (2006.01) |
| B64D 27/24 | (2024.01) |

(52) U.S. Cl.
CPC ............ B64D 31/06 (2013.01); B60L 3/0046 (2013.01); B60L 50/60 (2019.02); B64D 27/10 (2013.01); B64D 27/24 (2013.01); B60L 2200/10 (2013.01); B64D 27/026 (2024.01)

(58) Field of Classification Search
None
See application file for complete search history.

(56) References Cited

U.S. PATENT DOCUMENTS

| | | | | |
|---|---|---|---|---|
| 2,673,048 | A * | 3/1954 | Larson | B64C 13/00 244/231 |
| 2,985,409 | A * | 5/1961 | Atwood | G05D 1/0623 244/191 |
| 3,322,375 | A * | 5/1967 | Larson | G05D 1/0607 701/4 |
| 5,186,416 | A * | 2/1993 | Fabre | G05D 1/0066 244/191 |
| 6,064,923 | A * | 5/2000 | Bilange | B64C 13/16 702/144 |

(Continued)

FOREIGN PATENT DOCUMENTS

| | | |
|---|---|---|
| JP | 2003-032906 A | 1/2003 |
| JP | 2020-075649 A | 5/2020 |

*Primary Examiner* — Jason H Duger
(74) *Attorney, Agent, or Firm* — Rankin, Hill & Clark LLP

(57) ABSTRACT

A flying object control device includes: a determination unit that determines, based on a remaining capacity of a battery, whether or not to restrict supply of surplus electric power to the battery, the surplus electric power being a surplus of electric power generated by a generator; and a control unit that, when the determination unit determines to restrict the supply of the surplus electric power to the battery, causes the surplus electric power to be consumed by a motor by increasing a rotor rotational speed that is a rotational speed of a rotor, and adjusts a steering angle of an elevator to restrict ascent of a fuselage caused by an increase in the rotor rotational speed.

8 Claims, 5 Drawing Sheets

(56) References Cited

U.S. PATENT DOCUMENTS

| | | | |
|---|---|---|---|
| 11,634,230 B2* | 4/2023 | Kawai | B64C 29/0025 |
| | | | 244/17.11 |
| 2018/0127104 A1* | 5/2018 | Kobayashi | B64U 50/19 |
| 2020/0148374 A1 | 5/2020 | Kawai | |
| 2022/0306307 A1* | 9/2022 | Tsutsumi | B60L 58/13 |

* cited by examiner

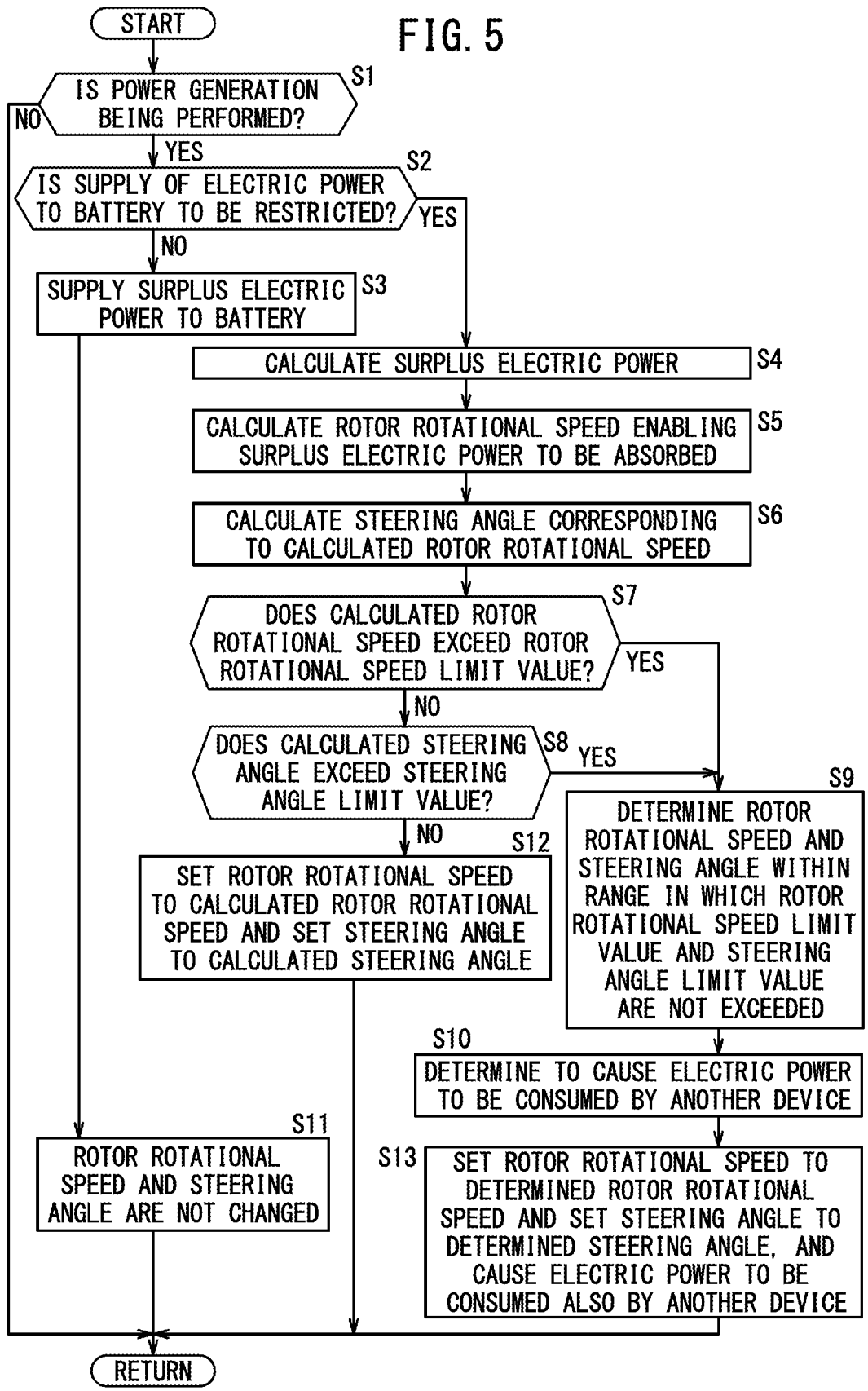

FLYING OBJECT CONTROL DEVICE, FLYING OBJECT CONTROL METHOD, AND NON-TRANSITORY COMPUTER-READABLE STORAGE MEDIUM STORING PROGRAM

CROSS-REFERENCE TO RELATED APPLICATIONS

This application is based upon and claims the benefit of priority from Japanese Patent Application No. 2022-033417 filed on Mar. 4, 2022, the contents of which are incorporated herein by reference.

BACKGROUND OF THE INVENTION

Field of the Invention

The present invention relates to a flying object control device, a flying object control method, and a non-transitory computer-readable storage medium storing a program.

Description of the Related Art

JP 2020-075649 A discloses a flying object including a gas turbine, a generator, a battery, and a motor. The generator is driven by the gas turbine. Electric power generated by the generator is stored in the battery. The motor is driven by electric power supplied from the battery. When the battery is fully charged, electric power is supplied from the battery to the motor in a state where the gas turbine is stopped.

SUMMARY OF THE INVENTION

The responsiveness of the output power that is actually output from the gas turbine is relatively low with respect to the output power required for the gas turbine. Even if the electric power required by the motor is rapidly reduced, the power generation amount of the generator driven by the gas turbine cannot be rapidly reduced. Therefore, if the electric power required by the motor is rapidly reduced, the battery may be overcharged.

An object of the present invention is to solve the above-mentioned problem.

According to a first aspect of the present invention, there is provided a flying object control device that controls a flying object including a generator, a battery configured to store electric power supplied from the generator, a motor configured to be driven by electric power supplied from at least one of the generator or the battery, a rotor configured to be driven by the motor, and an elevator configured to adjust an elevation angle of a fuselage, the flying object control device comprising: a determination unit configured to determine, based on a remaining capacity of the battery, whether or not to restrict supply of surplus electric power to the battery, the surplus electric power being a surplus of electric power generated by the generator; and a control unit configured to, when the determination unit determines to restrict the supply of the surplus electric power to the battery, cause the surplus electric power to be consumed by the motor by increasing a rotor rotational speed that is a rotational speed of the rotor, and to adjust a steering angle of the elevator to restrict ascent of the fuselage caused by an increase in the rotor rotational speed.

According to a second aspect of the present invention, there is provided a flying object control method for controlling a flying object including a generator, a battery configured to store electric power supplied from the generator, a motor configured to be driven by electric power supplied from at least one of the generator or the battery, a rotor configured to be driven by the motor, and an elevator configured to adjust an elevation angle of a fuselage, the flying object control method comprising: determining, based on a remaining capacity of the battery, whether or not to restrict supply of surplus electric power to the battery, the surplus electric power being a surplus of electric power generated by the generator; and when it is determined in the determining that the supply of the surplus electric power to the battery is to be restricted, causing the surplus electric power to be consumed by the motor by increasing a rotor rotational speed that is a rotational speed of the rotor, and adjusting a steering angle of the elevator to restrict ascent of the fuselage caused by an increase in the rotor rotational speed.

According to a third aspect of the present invention, there is provided a non-transitory computer-readable storage medium storing a program, wherein a computer is provided in a flying object including a generator, a battery configured to store electric power supplied from the generator, a motor configured to be driven by electric power supplied from at least one of the generator or the battery, a rotor configured to be driven by the motor, and an elevator configured to adjust an elevation angle of a fuselage, the program causing the computer to execute a process comprising: determining, based on a remaining capacity of the battery, whether or not to restrict supply of surplus electric power to the battery, the surplus electric power being a surplus of electric power generated by the generator; and when it is determined in the determining that the supply of the surplus electric power to the battery is to be restricted, causing the surplus electric power to be consumed by the motor by increasing a rotor rotational speed that is a rotational speed of the rotor, and adjusting a steering angle of the elevator to restrict ascent of the fuselage caused by an increase in the rotor rotational speed.

According to the present invention, it is possible to provide a flying object control device, a flying object control method, and a non-transitory computer-readable storage medium storing a program that are capable of suppressing overcharging of a battery.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a flowchart showing a flying object control method according to the embodiment.

DETAILED DESCRIPTION OF THE INVENTION

Embodiment

Figure 1:
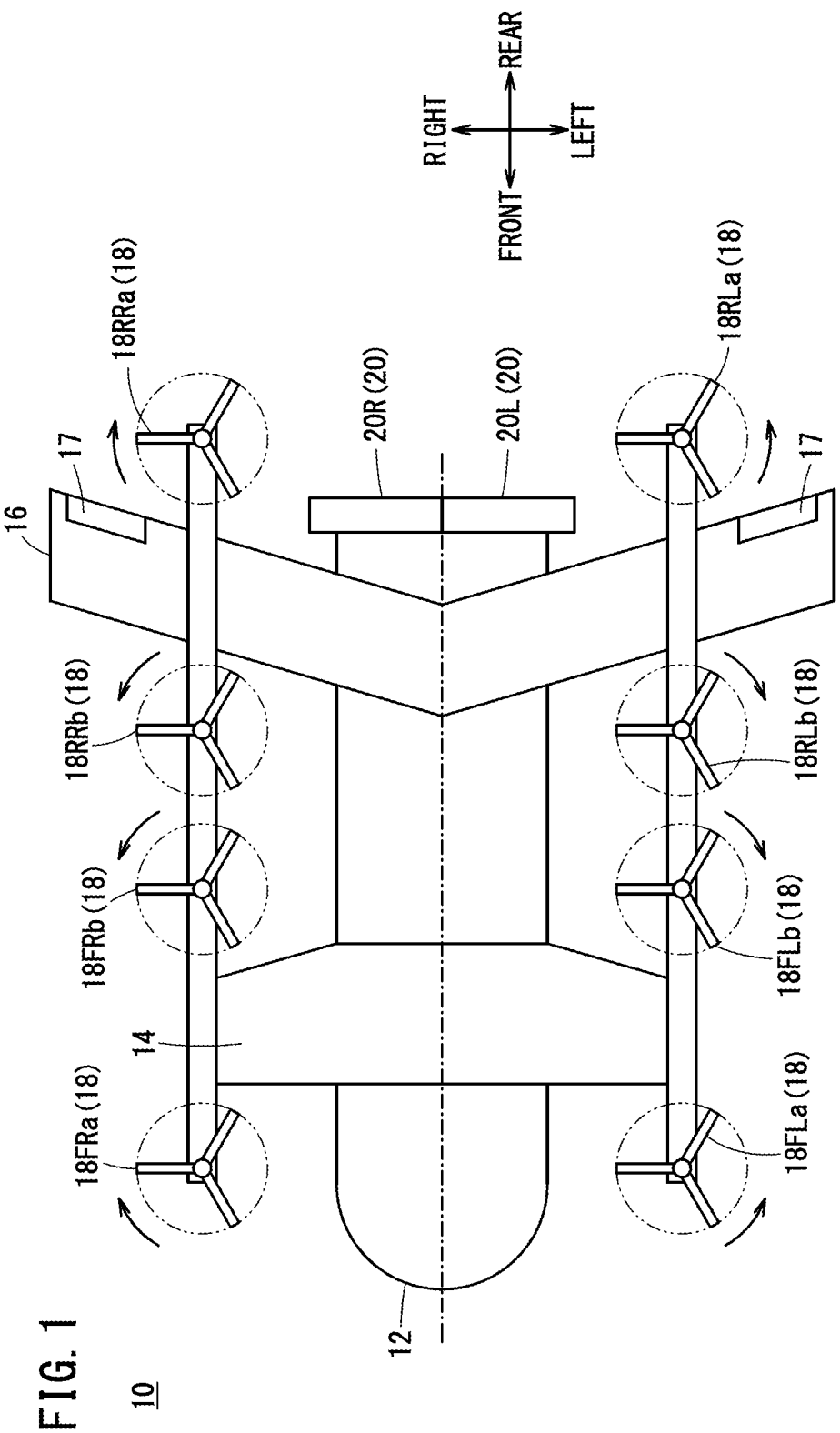
FIG. 1 is a schematic diagram showing a flying object according to an embodiment.

A flying object control device, a flying object control method, and a non-transitory computer-readable storage medium storing a program according to an embodiment will be described with reference to the drawings. FIG. 1 is a schematic diagram showing a flying object according to the present embodiment.

A flying object 10 according to the present embodiment is, for example, an electric vertical take-off and landing (eV-TOL) aircraft.

The flying object 10 can include a fuselage 12. The fuselage 12 can be provided with a cockpit (not shown), a cabin (not shown), and the like. A pilot (not shown) can ride in the cockpit. The pilot can control the flying object 10. A passenger or the like (not shown) can ride in the cabin. The flying object 10 may be automatically controlled without the pilot boarding the flying object 10.

The flying object 10 can include a front wing 14 and a rear wing 16. When the flying object 10 moves forward, lift is generated in each of the front wing 14 and the rear wing 16. An elevator 17 can be provided at the rear end of the rear wing 16. The elevator 17 can adjust the elevation angle of the fuselage 12. The rear wing 16 can also be provided with components other than the elevator 17, which are omitted here. The elevator 17 may also be provided on the front wing 14.

The flying object 10 can include a plurality of VTOL rotors (rotors) 18. For example, the flying object 10 can include a VTOL rotor 18FLa, a VTOL rotor 18FLb, a VTOL rotor 18RLa, and a VTOL rotor 18RLb. The flying object 10 can further include a VTOL rotor 18FRa, a VTOL rotor 18FRb, a VTOL rotor 18RRa, and a VTOL rotor 18RRb. The VTOL rotor 18 can be driven by a motor 31A (see FIG. 2). Reference numeral 18 is used when the individual VTOL rotors are described without being distinguished from each other, and reference numerals 18FLa, 18FLb, 18RLa, 18RLb, 18FRa, 18FRb, 18RRa, and 18RRb are used when the individual VTOL rotors are described by being distinguished from each other.

The longitudinal direction of the rotation shaft provided in the VTOL rotor 18 is the up-down direction. The VTOL rotor 18 is a vertical rotor which is capable of generating vertical thrust. By appropriately adjusting the rotational speed of the VTOL rotor 18 and the pitch angle of the blades, the thrust of the VTOL rotor 18 can be controlled. Lift thrust is obtained by controlling the thrust of the VTOL rotor 18. The lift thrust indicates the vertical thrust. By controlling the thrust of the VTOL rotor 18, a roll moment, a pitch moment, and a yaw moment act on the fuselage 12. The VTOL rotor 18 can be used during vertical take-off, during transition from vertical take-off to cruising, during transition from cruising to vertical landing, during vertical landing, during hovering, and the like. Further, the VTOL rotor 18 can also be used during attitude control.

The flying object 10 can include a plurality of cruise rotors 20L and 20R. The cruise rotors 20L and 20R can be provided at the rear portion of the fuselage 12. The cruise rotor 20 can be driven by a motor 31B (see FIG. 2). Reference numeral 20 is used when the individual cruise rotors are described without being distinguished from each other, and reference numerals 20L and 20R are used when the individual cruise rotors are described by being distinguished from each other.

The longitudinal direction of the rotation shaft of the cruise rotor 20 is the front-rear direction. The cruise rotor 20 is a horizontal rotor which is capable of generating horizontal thrust. By adjusting the rotational speed of the cruise rotor 20 and the pitch angle of the blades of the cruise rotor 20, the thrust of the cruise rotor 20 is controlled. Cruise thrust is obtained by controlling the thrust of the cruise rotor 20. The cruise thrust indicates the horizontal thrust. The cruise rotor 20 can be used during transition from vertical take-off to cruising, during cruising, during transition from cruising to vertical landing, and the like.

Figure 2:
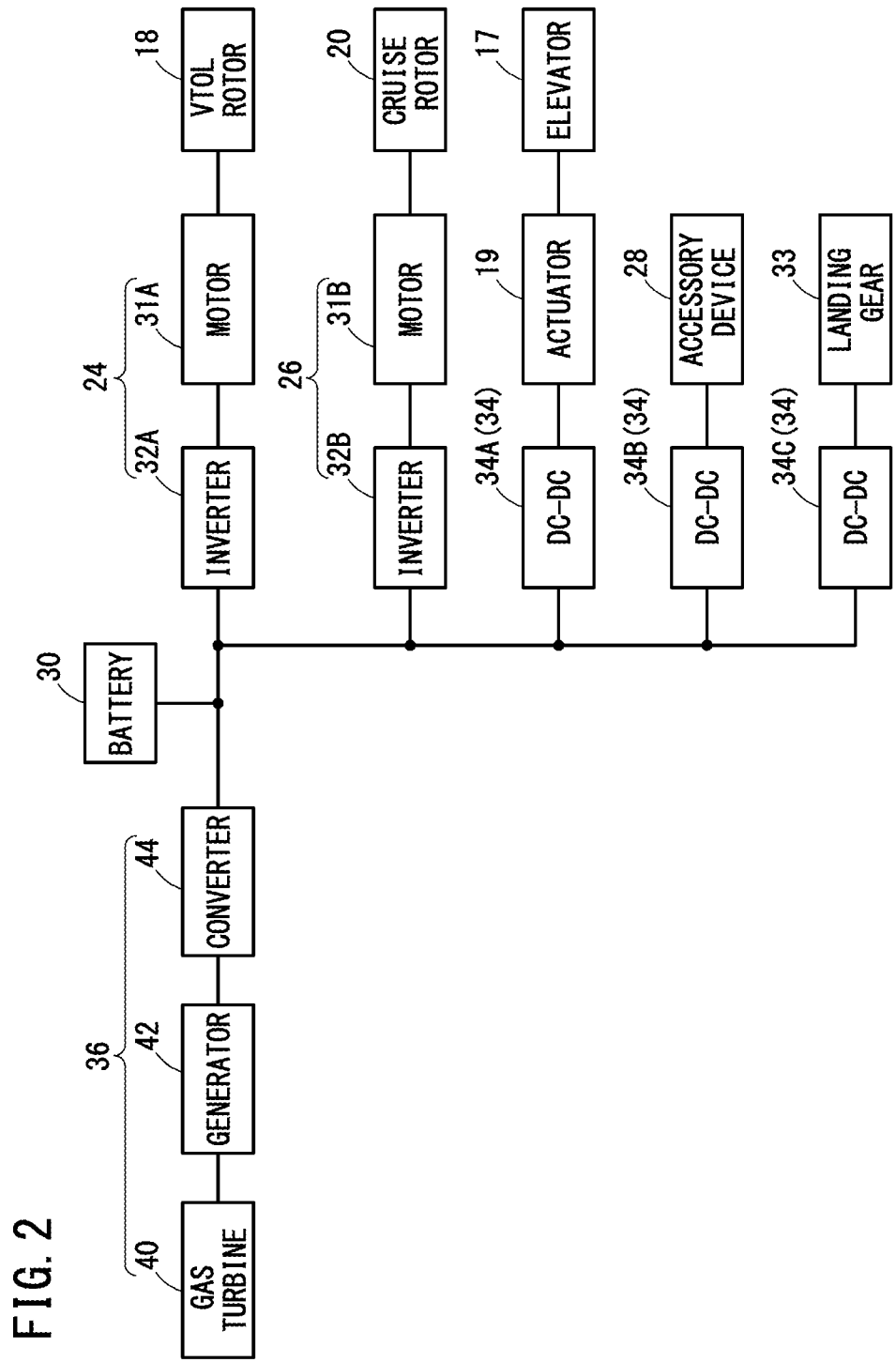
FIG. 2 is a block diagram showing a portion of the flying object according to the embodiment.

FIG. 2 is a block diagram showing a portion of the flying object according to the present embodiment.

The flying object 10 includes a power generation unit 36 and a battery 30. The flying object 10 is a hybrid aircraft provided with the power generation unit 36 and the battery 30 as power sources. The power generation unit 36 can include a gas turbine 40, a generator 42, and a converter 44. Although the flying object 10 can include a plurality of power generation units 36, one of the plurality of power generation units 36 is illustrated in FIG. 2.

Figure 3:
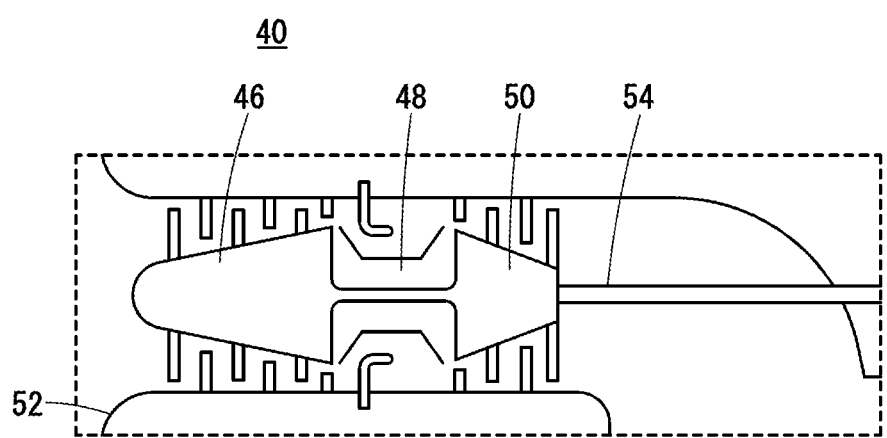
FIG. 3 is a schematic diagram showing a gas turbine.

FIG. 3 is a schematic diagram showing the gas turbine.

As shown in FIG. 3, the gas turbine 40 can include a compressor 46, a combustion chamber 48, and a turbine 50. Air drawn in through an inlet 52 can be compressed by the compressor 46. The air is compressed by the compressor 46 to obtain high-pressure air. The high-pressure air thus obtained is supplied to the combustion chamber 48. Fuel is injected into the high-pressure air in the combustion chamber 48. The combustion of the fuel in the combustion chamber 48 generates high-temperature and high-pressure gas. The turbine 50 is rotated by the high-pressure gas thus generated. The energy of the high-temperature and high-pressure gas is converted into rotational energy by the turbine 50, and is output via an output shaft 54. The rotational energy thus obtained can also be used to rotate the compressor 46.

As shown in FIG. 2, the generator 42 is connected to the gas turbine 40. More specifically, the generator 42 is connected to the output shaft 54 of the gas turbine 40. The generator 42 is driven by the gas turbine 40, whereby the generator 42 can generate electric power.

The converter 44 is connected to the generator 42. The converter 44 converts the AC power output from the generator 42 into DC power and outputs the DC power.

The electric power generated by the power generation unit 36 can be supplied to a VTOL drive unit 24, a cruise drive unit 26, and the like described below, without passing through the battery 30. The battery 30 can be charged with the electric power generated by the power generation unit 36. When the electric power generated by the power generation unit 36 is insufficient with respect to electric power required by the VTOL drive unit 24, the cruise drive unit 26, and the like, the electric power stored in the battery 30 can be supplied to the VTOL drive unit 24, the cruise drive unit 26, and the like.

When the electric power generated by the power generation unit 36 is greater than the electric power required by the VTOL drive unit 24, the cruise drive unit 26, and the like, surplus electric power is generated. The responsiveness of the output power that is actually output from the gas turbine 40 is relatively low with respect to the output power required for the gas turbine 40. Therefore, even if the electric power required by the VTOL drive unit 24, the cruise drive unit 26, and the like is rapidly reduced, the power generation amount of the power generation unit 36 cannot be rapidly reduced. Therefore, when the electric power required by the VTOL drive unit 24, the cruise drive unit 26, and the like is rapidly reduced, surplus electric power is generated.

Although the flying object 10 can include a plurality of batteries 30, one of the plurality of batteries 30 is illustrated in FIG. 2. Although the flying object 10 can include a plurality of VTOL drive units 24, one of the plurality of VTOL drive units 24 is illustrated in FIG. 2. Although the flying object 10 can include a plurality of cruise drive units 26, one of the plurality of cruise drive units 26 is illustrated in FIG. 2.

The VTOL drive unit 24 can be provided on the VTOL rotor 18. The VTOL drive unit 24 can include the motor 31A and an inverter 32A. The motor 31A is, for example, a three phase motor. An output shaft (not shown) provided in the motor 31A is coupled to the rotation shaft provided in the VTOL rotor 18. The inverter 32A converts the DC power input to the inverter 32A into three phase AC power and supplies the three phase AC power to the motor 31A.

The cruise drive unit 26 can be provided on the cruise rotor 20. The cruise drive unit 26 can include the motor 31B and an inverter 32B. The motor 31B is, for example, a three phase motor. An output shaft (not shown) provided in the motor 31B is coupled to the rotation shaft provided in the cruise rotor 20. The inverter 32B converts the DC power input to the inverter 32B into three phase AC power and supplies the three phase AC power to the motor 31B.

As described above, the flying object 10 can include the elevator 17. Although the flying object 10 can include a plurality of elevators 17, one of the plurality of elevators 17 is illustrated in FIG. 2. The elevator 17 can include an actuator 19 for adjusting the steering angle of the elevator 17. The actuator 19 is connected to the battery 30 or the like via a DC-DC converter 34A. The DC-DC converter 34A steps up or steps down the DC voltage input to the DC-DC converter 34A, and supplies the stepped-up or stepped-down DC voltage to the actuator 19.

The flying object 10 can include an accessory device 28. Although the flying object 10 can include a plurality of accessory devices 28, one of the plurality of accessory devices 28 is illustrated in FIG. 2. Examples of the accessory device 28 can include an air-conditioning device and a refrigerating device (refrigerator). The air-conditioning device can adjust the temperature, humidity, and the like of the air inside the fuselage 12. The refrigerating device can refrigerate food and the like. The accessory device 28 is connected to the battery 30 or the like via a DC-DC converter 34B. The DC-DC converter 34B steps up or steps down the DC voltage input to the DC-DC converter 34B, and supplies the stepped-up or stepped-down DC voltage to the accessory device 28.

The flying object 10 can include a landing gear 33. The landing gear 33 can support the fuselage 12 on the ground. The landing gear 33 can absorb an impact or the like generated when the flying object 10 lands. Although the flying object 10 can include a plurality of landing gears 33, one of the plurality of landing gears 33 is illustrated in FIG. 2. The landing gear 33 is connected to the battery 30 or the like via a DC-DC converter 34C. The DC-DC converter 34C steps up or steps down the DC voltage input to the DC-DC converter 34C, and supplies the stepped-up or stepped-down DC voltage to the landing gear 33. Reference numeral 34 is used when the individual DC-DC converters are described without being distinguished from each other, and reference numerals 34A to 34C are used when the individual DC-DC converters are described by being distinguished from each other.

Figure 4:
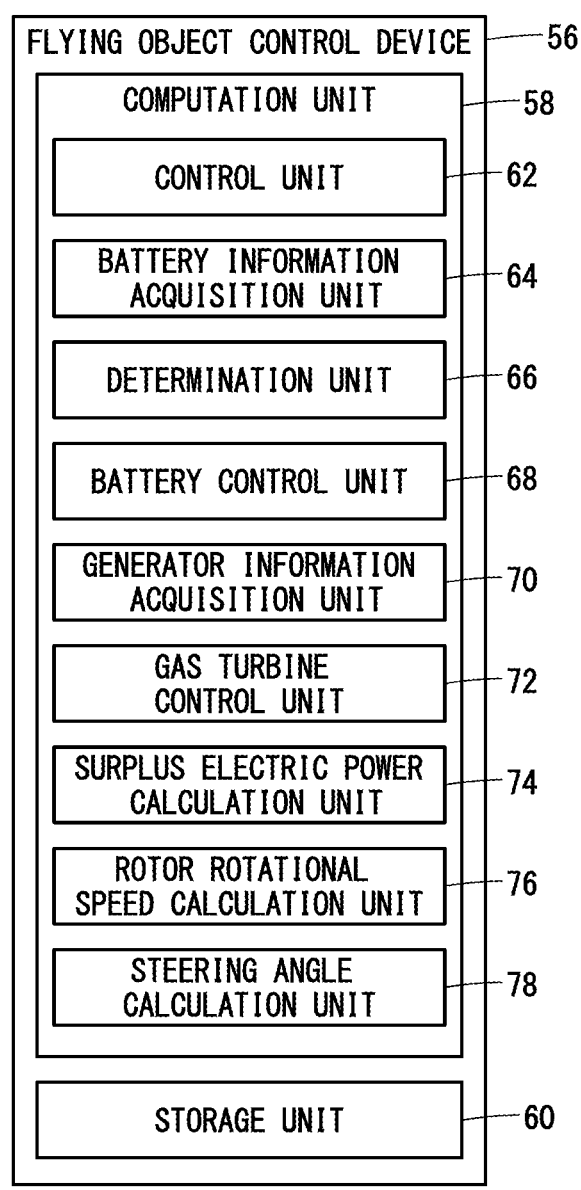
FIG. 4 is a block diagram showing a flying object control device according to the embodiment.

FIG. 4 is a block diagram showing a flying object control device according to the present embodiment.

A flying object control device 56 can include a computation unit 58 and a storage unit 60. The computation unit 58 is, for example, a processor such as a central processing unit (CPU) or a graphics processing unit (GPU). The computation unit 58 can be configured by a plurality of processors, for example. The computation unit 58 can include a control unit 62, a battery information acquisition unit 64, a determination unit 66, a battery control unit 68, a generator information acquisition unit 70, a gas turbine control unit 72, a surplus electric power calculation unit 74, a rotor rotational speed calculation unit 76, and a steering angle calculation unit 78. The control unit 62, the battery information acquisition unit 64, the determination unit 66, the battery control unit 68, the generator information acquisition unit 70, the gas turbine control unit 72, the surplus electric power calculation unit 74, the rotor rotational speed calculation unit 76, and the steering angle calculation unit 78 can be realized by the computation unit 58 executing programs stored in the storage unit 60.

At least part of the control unit 62, the battery information acquisition unit 64, the determination unit 66, the battery control unit 68, the generator information acquisition unit 70, the gas turbine control unit 72, the surplus electric power calculation unit 74, the rotor rotational speed calculation unit 76, and the steering angle calculation unit 78 may be realized by an integrated circuit such as an application specific integrated circuit (ASIC) or a field-programmable gate array (FPGA). At least part of the control unit 62, the battery information acquisition unit 64, the determination unit 66, the battery control unit 68, the generator information acquisition unit 70, the gas turbine control unit 72, the surplus electric power calculation unit 74, the rotor rotational speed calculation unit 76, and the steering angle calculation unit 78 may be realized by an electronic circuit including a discrete device.

The storage unit 60 is a computer-readable storage medium. The storage unit 60 can include a volatile memory (not shown) and a non-volatile memory (not shown). Examples of the volatile memory can include a random access memory (RAM). The volatile memory is used as a working memory of the processor and temporarily stores data and the like required for processing or computation. Examples of the non-volatile memory can include a read only memory (ROM) and a flash memory. The non-volatile memory is used as a storage memory and stores programs, tables, maps, and the like. At least a part of the storage unit 60 may be included in the processor, the integrated circuit, or the like described above.

The control unit 62 governs overall control of the flying object control device 56. The control unit 62 can control the VTOL rotor 18. The rotational speed of the VTOL rotor 18 can be controlled by controlling the inverter 32A. Further, the control unit 62 can also control the cruise rotor 20. The rotational speed of the cruise rotor 20 can be controlled by controlling the inverter 32B. The control unit 62 can adjust the steering angle of the elevator 17. The steering angle of the elevator 17 can be adjusted by controlling the actuator 19. The control unit 62 can control the flight of the flying object 10 by appropriately controlling the VTOL rotor 18, the cruise rotor 20, the elevator 17, and the like.

The battery information acquisition unit 64 can acquire information related to the battery 30. The battery information acquisition unit 64 can acquire information related to a state of charge (SOC) of the battery 30. The SOC of the battery 30 can be determined by a battery control device (not shown). The battery control device can acquire information related to a voltage, a current, a temperature, and the like of the battery 30 using sensors (not shown), and calculate the SOC of the battery 30 using a predetermined algorithm, a table, and the like. The battery control device can supply information related to the SOC of the battery 30 to the flying object control device 56. In this way, information related to the remaining capacity of the battery 30 can be acquired by the battery information acquisition unit 64.

The determination unit 66 can determine whether or not to restrict the supply of surplus electric power, which is a surplus of electric power generated by the generator 42, to the battery 30, based on the remaining capacity of the battery 30. For example, when the remaining capacity of the battery 30 is equal to or greater than a remaining capacity threshold value determined in advance, the determination unit 66 can restrict the supply of the surplus electric power to the battery 30. When the remaining capacity of the battery 30 is equal to or greater than the remaining capacity threshold value, charging of the battery 30 is restricted. Therefore, according to the present embodiment, overcharging of the battery 30 can be prevented.

The battery control unit 68 can control charging of the battery 30 and can control power supply from the battery 30. When the determination unit 66 determines to restrict the supply of the surplus electric power to the battery 30, the battery control unit 68 restricts the supply of the surplus electric power to the battery 30. When the determination unit 66 does not determine to restrict the supply of the surplus electric power to the battery 30, the battery control unit 68 does not restrict the supply of the surplus electric power to the battery 30.

The generator information acquisition unit 70 can acquire information related to the generator 42. The generator information acquisition unit 70 can acquire information indicating the rotational speed of the generator 42.

The gas turbine control unit 72 can control the gas turbine 40. Specifically, the gas turbine control unit 72 can control the output power of the gas turbine 40. The gas turbine control unit 72 can control the gas turbine 40 so that the generator 42 can generate electric power corresponding to the electric power required by the flying object 10. The electric power required by the flying object 10 can be calculated by the control unit 62, for example, but the present invention is not limited thereto.

The surplus electric power calculation unit 74 can calculate a surplus electric power. The surplus electric power calculation unit 74 can calculate the surplus electric power by subtracting the electric power consumed by the flying object 10 from the electric power generated by the power generation unit 36. The electric power generated by the power generation unit 36 can be calculated based on, for example, the information indicating the rotational speed of the generator 42, but the present invention is not limited thereto. The electric power generated by the power generation unit 36 can be calculated by the control unit 62, for example, but the present invention is not limited thereto. The electric power consumed by the flying object 10 can be calculated based on the information indicating the rotational speed of the VTOL rotor 18, the information indicating the rotational speed of the cruise rotor 20, and the like, but the present invention is not limited thereto. The electric power consumed by the flying object 10 can be calculated by the control unit 62, for example, but the present invention is not limited thereto.

The rotor rotational speed calculation unit 76 can calculate the rotor rotational speed, which is the rotational speed of the VTOL rotor 18, for a case where the surplus electric power is consumed by the motor 31A by increasing the rotor rotational speed.

If the surplus electric power is consumed by the motor 31A by simply increasing the rotational speed of the VTOL rotor 18, the fuselage 12 ascends. In the present embodiment, the ascent of the fuselage 12 is suppressed by adjusting the steering angle of the elevator 17 so that the fuselage 12 descends.

The steering angle calculation unit 78 can calculate the steering angle of the elevator 17 for a case where the ascent of the fuselage 12 caused by the increase in the rotor rotational speed is restricted by adjusting the steering angle.

When the determination unit 66 determines to restrict the supply of the surplus electric power to the battery 30, the control unit 62 can perform the following control. Specifically, in this case, the control unit 62 rotates the VTOL rotor 18 at the rotor rotational speed calculated by the rotor rotational speed calculation unit 76, and adjusts the steering angle of the elevator 17 to the steering angle calculated by the steering angle calculation unit 78.

When the surplus electric power is excessive, if an attempt is made to absorb the surplus electric power by increasing the rotational speed of the VTOL rotor 18, the rotor rotational speed may exceed a rotor rotational speed limit value determined in advance. In addition, when the surplus electric power is excessive, if an attempt is made to adjust the steering angle of the elevator 17 in order to restrict the ascent of the fuselage 12 caused by the increase in the rotational speed of the VTOL rotor 18, the steering angle of the elevator 17 may exceed a steering angle limit value determined in advance. When the surplus electric power cannot be absorbed by the motor 31A unless the rotor rotational speed exceeds the rotor rotational speed limit value determined in advance and unless the steering angle of the elevator 17 exceeds the steering angle limit value determined in advance, the control unit 62 performs the following control. Specifically, in such a case, the control unit 62 can cause the surplus electric power to be further consumed by another device different from the motor 31A. Examples of the other device can include the accessory device 28 and the landing gear 33. As described above, examples of the accessory device 28 can include an air-conditioning device and a refrigerating device. Note that the other device is not limited to these devices.

The air-conditioning device can include a compressor (not shown). The compressor can include a motor (not shown). By appropriately adjusting the rotational speed of the motor, the power consumption of the air-conditioning device can be appropriately adjusted.

The refrigerating device can include a compressor (not shown) as well. The compressor can include a motor (not shown). By appropriately adjusting the rotational speed of the motor, the power consumption of the refrigerating device can be appropriately adjusted.

The landing gear 33 can include an actuator (not shown). The actuator can include a motor (not shown). By appropriately adjusting the rotational speed of the motor, the power consumption of the landing gear 33 can be appropriately adjusted.

Next, the flying object control method according to the present embodiment will be described with reference to FIG. 5. FIG. 5 is a flowchart showing the flying object control method according to the present embodiment.

In step S1, the control unit 62 determines whether or not power generation is being performed by the power generation unit 36. When power generation is being performed by the power generation unit 36 (YES in step S1), the process proceeds to step S2. When power generation is not being performed by the power generation unit 36 (NO in step S1), the process shown in FIG. 5 is completed.

In step S2, the determination unit 66 determines whether or not to restrict the supply of surplus electric power, which is a surplus of electric power generated by the generator 42, to the battery 30, based on the remaining capacity of the battery 30. When the determination unit 66 determines not to restrict the supply of the surplus electric power to the battery 30 (NO in step S2), the process proceeds to step S3. When the determination unit 66 determines to restrict the supply of the surplus electric power to the battery 30 (YES in step S2), the process proceeds to step S4.

In step S3, the control unit 62 supplies the surplus electric power to the battery 30. Thereafter, the process proceeds to step S11.

In step S4, the surplus electric power calculation unit 74 calculates the surplus electric power. Thereafter, the process proceeds to step S5.

In step S5, the rotor rotational speed calculation unit 76 calculates the rotor rotational speed, which is the rotational speed of the VTOL rotor 18, for a case where the surplus electric power is consumed by the motor 31A by increasing the rotor rotational speed. Thereafter, the process proceeds to step S6.

In step S6, the steering angle calculation unit 78 calculates the steering angle of the elevator 17 for a case where the ascent of the fuselage 12 caused by the increase in the rotor rotational speed is restricted by adjusting the steering angle. Thereafter, the process proceeds to step S7.

In step S7, the control unit 62 determines whether or not the rotor rotational speed calculated by the rotor rotational speed calculation unit 76 exceeds a rotor rotational speed limit value determined in advance. When the rotor rotational speed calculated by the rotor rotational speed calculation unit 76 does not exceed the rotor rotational speed limit value determined in advance (NO in step S7), the process proceeds to step S8. When the rotor rotational speed calculated by the rotor rotational speed calculation unit 76 exceeds the rotor rotational speed limit value determined in advance (YES in step S7), the process proceeds to step S9.

In step S8, it is determined whether or not the steering angle calculated by the steering angle calculation unit 78 exceeds a steering angle limit value determined in advance. When the steering angle calculated by the steering angle calculation unit 78 does not exceed the steering angle limit value determined in advance (NO in step S8), the process proceeds to step S12. When the steering angle calculated by the steering angle calculation unit 78 exceeds the steering angle limit value determined in advance (YES in step S8), the process proceeds to step S9.

In step S9, the control unit 62 determines the rotational speed of the VTOL rotor 18 and the steering angle of the elevator 17 within a range in which the rotational speed of the VTOL rotor 18 does not exceed the rotor rotational speed limit value and the steering angle of the elevator 17 does not exceed the steering angle limit value. Thereafter, the process proceeds to step S10.

In step S10, the control unit 62 determines to cause electric power to be consumed by another device. Specifically, the control unit 62 determines to cause the surplus electric power to be further consumed by another device different from the motor 31A. In other words, the control unit 62 determines the electric power to be consumed by the other device. As described above, examples of the other device can include the accessory device 28 and the landing gear 33. As described above, examples of the accessory device 28 can include an air-conditioning device and a refrigerating device. The control unit 62 can determine, for example, electric power to be consumed by the air-conditioning device. Further, the control unit 62 can determine, for example, electric power to be consumed by the refrigerating device. Furthermore, the control unit 62 can determine, for example, electric power to be consumed by the landing gear 33.

In step S11, the control unit 62 does not change the rotational speed of the VTOL rotor 18 and does not change the steering angle of the elevator 17.

In step S12, the control unit 62 sets the rotational speed of the VTOL rotor 18 to the rotor rotational speed calculated by the rotor rotational speed calculation unit 76. In addition, the control unit 62 sets the steering angle of the elevator 17 to the steering angle calculated by the steering angle calculation unit 78.

In step S13, the control unit 62 sets the rotational speed of the VTOL rotor 18 to the rotor rotational speed determined in step S9. Further, the control unit 62 sets the steering angle of the elevator 17 to the steering angle determined in step S9. In addition, the control unit 62 causes the surplus electric power to be appropriately consumed also by the other device. In other words, the control unit 62 causes the electric power determined in step S10 to be consumed by the other device.

Thus, the process shown in FIG. 5 is completed.

In this manner, according to the present embodiment, when the determination unit 66 determines to restrict the supply of the surplus electric power to the battery 30, the surplus electric power is consumed by the motor 31A by increasing the rotor rotational speed, which is the rotational speed of the VTOL rotor 18. Therefore, according to the present embodiment, it is possible to provide the flying object control device 56 that can suppress overcharging of the battery 30. Moreover, according to the present embodiment, the ascent of the fuselage 12 caused by the increase in the rotor rotational speed is restricted by adjusting the steering angle of the elevator 17. Therefore, according to the present embodiment, it is possible to favorably suppress overcharging of the battery 30 while preventing deterioration in ride comfort and the like.

Modified Embodiment

The present invention is not limited to the above disclosure, and various modifications are possible without departing from the essence and gist of the present invention.

For example, in the above-described embodiment, the case where the surplus electric power is consumed by increasing the rotational speed of the VTOL rotor 18 has been described as an example, but the present invention is not limited thereto. In addition to increasing the rotational speed of the VTOL rotor 18, the rotational speed of the cruise rotor 20 may also be increased. That is, the other device described above may be the motor 31B that drives the cruise rotor 20.

The invention that can be grasped from the above embodiments will be described below.

The flying object control device (56) controls the flying object (10) including the generator (42), the battery (30) configured to store electric power supplied from the generator, the motor (31A) configured to be driven by electric power supplied from at least one of the generator or the battery, the rotor (18) configured to be driven by the motor, and the elevator (17) configured to adjust an elevation angle of the fuselage (12), the flying object control device comprising: the determination unit (66) configured to determine, based on a remaining capacity of the battery, whether or not to restrict supply of surplus electric power to the battery, the surplus electric power being a surplus of electric power generated by the generator; and the control unit (62) configured to, when the determination unit determines to restrict the supply of the surplus electric power to the battery, cause the surplus electric power to be consumed by the motor by increasing a rotor rotational speed that is a rotational speed of the rotor, and to adjust a steering angle of the elevator to restrict ascent of the fuselage caused by an increase in the rotor rotational speed. According to such a configuration, when the determination unit determines to restrict the supply of the surplus electric power to the battery, the surplus electric power is consumed by the motor by increasing the rotor rotational speed that is the rotational speed of the rotor. Therefore, according to such a configuration, it is possible to provide the flying object control device capable of suppressing overcharging of the battery. In addition, according to such a configuration, the ascent of the fuselage caused by the increase in the rotor rotational speed is restricted by adjusting the steering angle of the elevator. Therefore, according to such a configuration, it is possible to favorably suppress overcharging of the battery while preventing deterioration in ride comfort and the like.

In the above-described flying object control device, the determination unit may determine to restrict the supply of the surplus electric power to the battery in a case where the remaining capacity of the battery is equal to or greater than the remaining capacity threshold value determined in advance.

In the above-described flying object control device, in a case where the rotor rotational speed exceeds the rotor rotational speed limit value determined in advance and the steering angle exceeds the steering angle limit value determined in advance if the surplus electric power is to be absorbed by the motor, the control unit may cause the surplus electric power to be further consumed by the other device (28, 33) different from the motor. According to such a configuration, overcharging of the battery can be more reliably suppressed.

In the above-described flying object control device, the other device may include at least one of the air-conditioning device (28), the refrigerating device (28), or the landing gear (33).

In the above-described flying object control device, the rotor may be the vertical rotor configured to generate vertical thrust, and the other device may include the other motor (31B) configured to drive the horizontal rotor (20) configured to generate horizontal thrust.

In the above-described flying object control device, the flying object may further include the gas turbine (40) including the compressor (46) and the turbine (50) configured to rotate integrally with the compressor, and the generator may be driven by the gas turbine.

The flying object control method is a method for controlling the flying object including the generator, the battery configured to store electric power supplied from the generator, the motor configured to be driven by electric power supplied from at least one of the generator or the battery, the rotor configured to be driven by the motor, and the elevator configured to adjust an elevation angle of the fuselage, the flying object control method comprising: determining, based on a remaining capacity of the battery, whether or not to restrict supply of surplus electric power to the battery, the surplus electric power being a surplus of electric power generated by the generator (S2); and when it is determined in the determining that the supply of the surplus electric power to the battery is to be restricted, causing the surplus electric power to be consumed by the motor by increasing a rotor rotational speed that is a rotational speed of the rotor, and adjusting a steering angle of the elevator to restrict ascent of the fuselage caused by an increase in the rotor rotational speed (S12, S13).

The non-transitory computer-readable storage medium stores a program, wherein a computer is provided in the flying object including the generator, the battery configured to store electric power supplied from the generator, the motor configured to be driven by electric power supplied from at least one of the generator or the battery, the rotor configured to be driven by the motor, and the elevator configured to adjust an elevation angle of the fuselage, and the program causes the computer to execute a process comprising: determining, based on a remaining capacity of the battery, whether or not to restrict supply of surplus electric power to the battery, the surplus electric power being a surplus of electric power generated by the generator; and when it is determined in the determining that the supply of the surplus electric power to the battery is to be restricted, causing the surplus electric power to be consumed by the motor by increasing a rotor rotational speed that is a rotational speed of the rotor, and adjusting a steering angle of the elevator to restrict ascent of the fuselage caused by an increase in the rotor rotational speed.

The invention claimed is:

1. A flying object control device that controls a flying object including a generator, a battery configured to store electric power supplied from the generator, a motor configured to be driven by electric power supplied from at least one of the generator or the battery, a rotor configured to be driven by the motor, and an elevator configured to adjust an elevation angle of a fuselage,
the flying object control device comprising:
a determination unit configured to determine, based on a remaining capacity of the battery, whether or not to restrict supply of surplus electric power to the battery, the surplus electric power being a surplus of electric power generated by the generator; and
a control unit configured to, when the determination unit determines to restrict the supply of the surplus electric power to the battery, cause the surplus electric power to be consumed by the motor by increasing a rotor rotational speed that is a rotational speed of the rotor, and to adjust a steering angle of the elevator to restrict ascent of the fuselage caused by an increase in the rotor rotational speed.

2. The flying object control device according to claim 1, wherein
the determination unit determines to restrict the supply of the surplus electric power to the battery in a case where the remaining capacity of the battery is equal to or greater than a remaining capacity threshold value determined in advance.

3. The flying object control device according to claim 2, wherein
in a case where the rotor rotational speed exceeds a rotor rotational speed limit value determined in advance and the steering angle exceeds a steering angle limit value determined in advance if the surplus electric power is to be absorbed by the motor, the control unit causes the surplus electric power to be further consumed by another device different from the motor.

4. The flying object control device according to claim 3, wherein
the other device includes at least one of an air-conditioning device, a refrigerating device, or a landing gear.

5. The flying object control device according to claim 3, wherein the rotor is a vertical rotor configured to generate vertical thrust, and the other device includes another motor configured to drive a horizontal rotor configured to generate horizontal thrust.

6. The flying object control device according to claim 1, wherein the flying object further includes a gas turbine including a compressor and a turbine configured to rotate integrally with the compressor, and the generator is driven by the gas turbine.

7. A flying object control method for controlling a flying object including a generator, a battery configured to store electric power supplied from the generator, a motor configured to be driven by electric power supplied from at least one of the generator or the battery, a rotor configured to be driven by the motor, and an elevator configured to adjust an elevation angle of a fuselage, the flying object control method comprising:

determining, based on a remaining capacity of the battery, whether or not to restrict supply of surplus electric power to the battery, the surplus electric power being a surplus of electric power generated by the generator; and when it is determined in the determining that the supply of the surplus electric power to the battery is to be restricted, causing the surplus electric power to be consumed by the motor by increasing a rotor rotational speed that is a rotational speed of the rotor, and adjusting a steering angle of the elevator to restrict ascent of the fuselage caused by an increase in the rotor rotational speed.

8. A non-transitory computer-readable storage medium storing a program, wherein a computer is provided in a flying object including a generator, a battery configured to store electric power supplied from the generator, a motor configured to be driven by electric power supplied from at least one of the generator or the battery, a rotor configured to be driven by the motor, and an elevator configured to adjust an elevation angle of a fuselage, the program causing the computer to execute a process comprising:

determining, based on a remaining capacity of the battery, whether or not to restrict supply of surplus electric power to the battery, the surplus electric power being a surplus of electric power generated by the generator; and when it is determined in the determining that the supply of the surplus electric power to the battery is to be restricted, causing the surplus electric power to be consumed by the motor by increasing a rotor rotational speed that is a rotational speed of the rotor, and adjusting a steering angle of the elevator to restrict ascent of the fuselage caused by an increase in the rotor rotational speed.

\* \* \* \* \*